US008194736B2

United States Patent
Youn

(10) Patent No.: US 8,194,736 B2
(45) Date of Patent: Jun. 5, 2012

(54) VIDEO DATA COMPRESSION WITH INTEGRATED LOSSY AND LOSSLESS COMPRESSION

(75) Inventor: Jeongnam Youn, San Jose, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 1055 days.

(21) Appl. No.: 12/103,427

(22) Filed: Apr. 15, 2008

(65) Prior Publication Data

US 2009/0257485 A1 Oct. 15, 2009

(51) Int. Cl.
*H04J 3/24* (2006.01)
*H04L 12/42* (2006.01)
*H04N 7/12* (2006.01)

(52) U.S. Cl. .............. 375/240.12; 370/451; 370/474

(58) Field of Classification Search .......... 375/240, 375/240.01, 240.03, 240.12, 240.23, 240.24, 375/240.25; 370/410, 412, 413, 451, 485–487; 348/397, 398, 420, 421, 405, 411
See application file for complete search history.

(56) References Cited

U.S. PATENT DOCUMENTS

| | | | | |
|---|---|---|---|---|
| 5,600,373 A | * | 2/1997 | Chui et al. | 375/240.1 |
| 5,847,762 A | | 12/1998 | Canfield et al. | |
| 6,157,740 A | * | 12/2000 | Buerkle et al. | 382/233 |
| 7,136,417 B2 | * | 11/2006 | Rodriguez | 375/240.29 |
| 2009/0161753 A1 | * | 6/2009 | Youn et al. | 375/240.01 |

FOREIGN PATENT DOCUMENTS

CN 1160253 A 9/1997

OTHER PUBLICATIONS

State Intellectual Property Office of the People's Republic of China, office action issued on Mar. 1, 2011 for corresponding Chinese Patent Application No. 200910133669.7 claiming priority to U.S. Appl. No. 12/103,427, translation (pp. 1/5 through 5/5) with claims (pp. 1/3 through 3/3); pp. 1-8.

* cited by examiner

*Primary Examiner* — Hanh Nguyen
(74) *Attorney, Agent, or Firm* — John P. O'Banion

(57) ABSTRACT

A method and apparatus to compress video data to smaller size and embed extra information into the compressed data using the integrated lossy and lossless compressions is described. The method can be used to compress reference frames of a video codec (coder/decoder) combines codec where the small noise is critical and to reduce bus bandwidth. Data transfer between an encoder and an external frame memory connected via an external bus in a video codec is reduced by compressing data from the encoder prior to inputting into the frame memory over the external bus, and decompressing the compressed data from the frame memory after retrieving over the external bus. Reference frames are compressed to variable size without causing any considerable artifact to reduce bus bandwidth between the encoder core and external memory. In the method, lossy and lossless compression is integrated to maximize the compression efficiency.

58 Claims, 10 Drawing Sheets

| P00 | P01 | P02 | P03 | P04 | P05 | P06 | P07 |
|-----|-----|-----|-----|-----|-----|-----|-----|
| P10 | P11 | P12 | P13 | P14 | P15 | P16 | P17 |
| P20 | P21 | P22 | P23 | P24 | P25 | P26 | P27 |
| P30 | P31 | P32 | P33 | P34 | P35 | P36 | P37 |

Luminance Block

FIG. 4A

| P00 | P01 | P02 | P03 |
|-----|-----|-----|-----|
| P10 | P11 | P12 | P13 |
| P20 | P21 | P22 | P23 |
| P30 | P31 | P32 | P33 |

Chrominance Block

FIG. 4B

|   |   |   |   |
|---|---|---|---|
|   | A | B |   |
|   | C | X |   |
|   |   |   |   |

FIG. 9A

| 0 | 0 | 0 | 0 | 0 |
|---|---|---|---|---|
| 0 |   |   |   |   |
| 0 |   |   |   |   |
| 0 |   |   |   |   |
| 0 |   |   |   |   |

FIG. 9B

| P00 | R01 | R02 | R03 | R04 | R05 | R06 | R07 |
|-----|-----|-----|-----|-----|-----|-----|-----|
| R10 | R11 | R12 | R13 | R14 | R15 | R16 | R17 |
| R20 | R21 | R22 | R23 | R24 | R25 | R26 | R27 |
| R30 | R31 | R32 | R33 | R34 | R35 | R36 | R37 |

Luminance Block

FIG. 10A

| P00 | R01 | R02 | R03 |
|-----|-----|-----|-----|
| R10 | R11 | R12 | R13 |
| R20 | R21 | R22 | R23 |
| R30 | R31 | R32 | R33 |

Chrominance Block

FIG. 10B

VIDEO DATA COMPRESSION WITH INTEGRATED LOSSY AND LOSSLESS COMPRESSION

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to video signal processing, and more particularly to compressing video data by combining lossy and lossless compressions to minimize the compression noise while reducing the amount of video data to reduce the frame (or reference) memory in a video codec where the compression noise needs to be minimized, or for general application, such as to transmit the video data over a network or to store the video data in a storage device.

2. Description of Related Art

Video data, or digitized visual information, is widely used today. It forms a significant aspect of the modern digital revolution in information technology. It is utilized in all types of systems for the creation, distribution or communication, and consumption or use of visual information. But video data is generally voluminous. This causes severe problems for both storage and transmission.

Data compression may generally be defined as a process of transforming information from one representation to another, smaller representation from which the original data, or a close approximation thereto, can be recovered by the complementary process of data decompression. The compression and decompression processes are often referred to as coding and decoding. A coding and decoding system is generally referred to as a codec, a system having both a coder and a decoder. Codecs generally follow established standards, such as MPEG2 and H.264.

The storage and transmission of large amounts of data are often facilitated by the use of compression and decompression techniques. In particular, the transmission and storage of visual images involves large amounts of data, and benefits greatly from image compression and decompression techniques.

In a codec or compression/decompression system, an image is input to an encoder to carry out the compression of the image. The compressed image from the encoder is either transmitted or stored. The compressed image is input into a decoder to carry out the decompression of the compressed image. The decompressed image is output from the decoder, and may be sent to an output device for viewing.

Video clips are made up of sequences of individual images or "frames." Video compression and decompression techniques process video signals to greatly reduce storage and bandwidth requirements for the compressed data while maximizing the perceived image quality of the decompressed data.

A still image is compressed by dividing an image into small pixel blocks that are transformed into a frequency domain representation, typically by a discrete cosine transform (DCT). Inverse DCT (IDCT) is used to reconstruct the original pixels from the DCT coefficients. Quantization or scaling of the DCT coefficients is used in the encoding process to retain more perceptually significant information and discard less perceptually significant information. Dequantization is the inverse process performed in the decoder.

There are many specific ways of implementing the coding and decoding processes. Since image features are usually larger than the blocks (typically 8×8 pixels) being processed, more efficient compression may use the correlation between adjacent blocks of the image. The encoder attempts to predict values of some coefficients based on values in surrounding blocks. Also, instead of quantizing and encoding the DCT coefficients directly, the differences between the actual coefficients and their predicted values may be quantized and encoded. Because the differences may be small, the number of bits required may be reduced. Color images are typically represented by using several color planes; typically one luminance (brightness) plane and two chrominance (color) planes are used. Macroblocks formed of several smaller blocks may also be used.

In video, motion between successive frames must also be taken into account. Video codecs use motion estimation and motion compensation based on similarities between consecutive video frames. Motion estimation attempts to find a region in a previously recorded frame (called a "reference frame") closely matching each macroblock in the current frame. For each macroblock, motion estimation produces a "motion vector," a set of horizontal and vertical offsets from the location of the macroblock in the current frame to the location of the selected matching region in the reference frame. The selected region is used as a prediction of the pixels in the current macroblock, and the difference ("prediction error") is computed and encoded. Motion compensation in a decoder uses the motion vectors to predict pixels of each macroblock.

The reference frame is not always the previously displayed frame in a sequence of video frames. Video compression often encodes frames in a different order from the order in which they are displayed. The encoder may skip several frames ahead and encode a future video frame, then skip back and encode the next frame in the display sequence.

Video compression occasionally encodes a video frame using still-image coding techniques only, without relying on previously encoded frames. These are called "intra-frames" or "I frames." Frames encoded using only a previously displayed reference frame are called "predictive frames" or "P frames," and frames encoded using both future and previously displayed reference frames are called "bidirectional frames" or "B frames." In a typical scenario, the codec encodes an I frame, skips ahead several frames and encodes a future P frame using the I frame as a reference frame, and then skips back to the next frame following the I frame. The frames between the I and P frames are encoded as B frames. Next, the encoder skips ahead several frames again, encodes another P frame using the first P frame as a reference frame, then skips back to fill the gap in the display sequence with B frames. The process continues with a new I frame inserted for every 12-15 P and B frames.

In most video codec architectures, the encoder core is implemented in separate hardware or software on a processor, and the frame memory is located outside the encoder core, typically in external memory connected through an external bus. The amount of data transfer between the encoder core and frame memory over the bus may be very large, causing high power consumption.

Accordingly it is desirable to provide a method and apparatus for reducing the amount of data transferred via external bus from an encoder to frame memory in a video codec.

BRIEF SUMMARY OF THE INVENTION

The invention is a method and apparatus to compress video data by combining lossy and lossless compressions. The invention can be applied to compress reference frames inside a video encoder or a video decoder. By way of example, and not of limitation, an embodiment of the invention is described herein for frame memory compression. However, the invention is not limited to frame memory compression and can be applied any video data compression application.

An aspect of the invention is a method to integrate lossy and lossless compression to minimize visual artifacts. If the frame memory is compressed, the drift noise caused by mismatch of reconstructed pixels in the encoder and decoder become significant visual artifacts. Therefore, the minimization of those mismatches is very important in frame memory compression.

Another aspect of the invention is a method for reducing data transfer between an encoder and an external frame memory connected via an external bus in a video codec, by compressing data from the encoder core prior to inputting into the frame memory over the external bus; and decompressing the compressed data from the frame memory after retrieving over the external bus.

Another aspect of the invention is a method for embedding extra information in video data without modifying the content of original data.

Another aspect of the invention is an improvement in a video codec having an encoder core and an external frame memory connected to the encoder core via an external bus, the improvement including a compression unit at the output of the encoder for compressing data from the encoder prior to inputting into the frame memory via the external bus; and a decompression unit at the input of the encoder for decompressing the compressed data from the frame memory after retrieving over the external bus.

Further aspects of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only:

FIG. 4A and FIG. 4B illustrate 8×4 luminance and 4×4 chrominance blocks, respectively.

FIG. 8A shows the processing of the first pixel and FIG. 8B shows the processing of the remaining pixels.

FIG. 9A is a pixel map showing the current pixel X and neighboring decompressed pixels A, B, C.

FIG. 9B is a pixel map showing an all zero outside boundary to a block.

FIG. 10A and FIG. 10B illustrate 8×4 luminance and 4×4 chrominance blocks after prediction, respectively.

DETAILED DESCRIPTION OF THE INVENTION

Referring more specifically to the drawings, for illustrative purposes the present invention is embodied in the method and apparatus generally shown in FIG. 3 through FIG. 10. It will be appreciated that the apparatus may vary as to configuration and as to details of the parts, and the method may vary as to its particular implementation, without departing from the basic concepts as disclosed herein.

Figure 1:
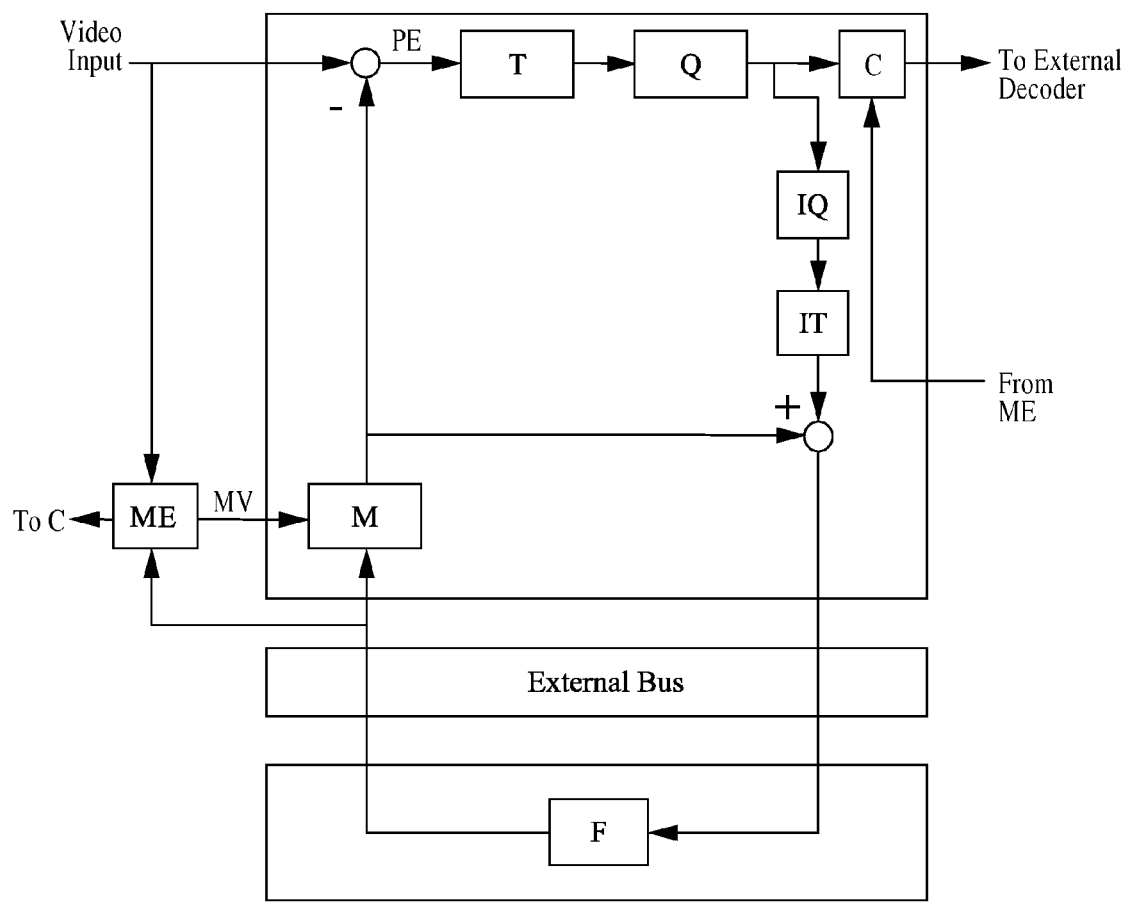
FIG. 1 is a simple block diagram of a prior art encoder/decoder of a video codec system.

A typical prior art video codec architecture, in which the encoder core is implemented in separate hardware or software on a processor, and the frame memory is located outside of the encoder core, is shown in FIG. 1. The basic architecture is conventional and well known in the art. Generally, the frame memory is implemented in external memory, connected over an external bus to the encoder core. T and Q are basic parts of the encoder, 'Transform such as DCT' and 'Quantization' respectively. C is the coder, which encodes the quantized DCT coefficients from T and Q. IT and IQ are basic parts of the embedded decoder, 'Inverse Transform' and 'Inverse Quantization'. M and F indicate 'Motion Compensation' and 'Frame Memory' respectively. The motion estimator ME provides motion vectors MV to M and C, and also reads the data from frame memory. The subtractor at the input provides prediction error PE data to Q. Codecs are typically built in accordance with well-established standards, such as MPEG2 and H.264.

The video data decoded in the local decoder inside of the decoder core is transferred to the frame memory. Also, the data stored in frame memory needs to be accessed during motion compensation and motion estimation. The problem is the amount of data transfer. In the case of HD size video, for example, 1448×1088 with 30 frames per second, the amount of data transfer is over 400 Mbytes. If B-picture is used, the required bus bandwidth could be more than 800 Mbytes per second during the motion estimation. Therefore, the power consumption by data transfer via external bus is significant and it is desirable to reduce the amount of data transfer. The present invention uses frame memory compression to reduce the amount of the original video data.

Figure 2:
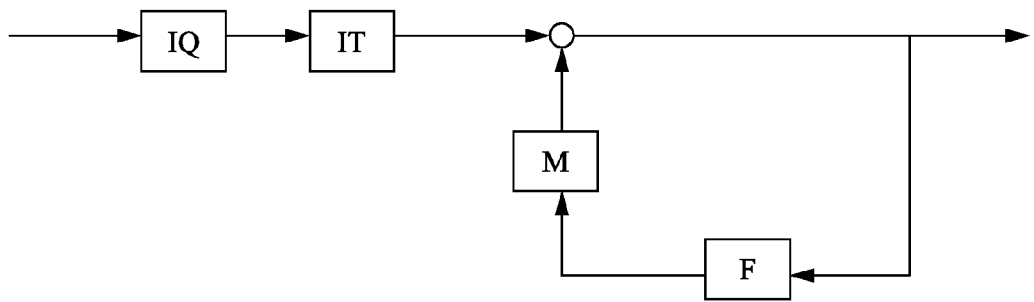
FIG. 2 is a simple block diagram of a generic prior art decoder.

FIG. 2 shows a functional block diagram of a generic decoder, which may receive the compressed video data output from the encoder of FIG. 1. Since IT, IQ, and M between the encoder and decoder exactly match, there is no data mismatch in the frame memory F. In other words, the displayed video is exactly the same as the encoder expects.

Figure 3:
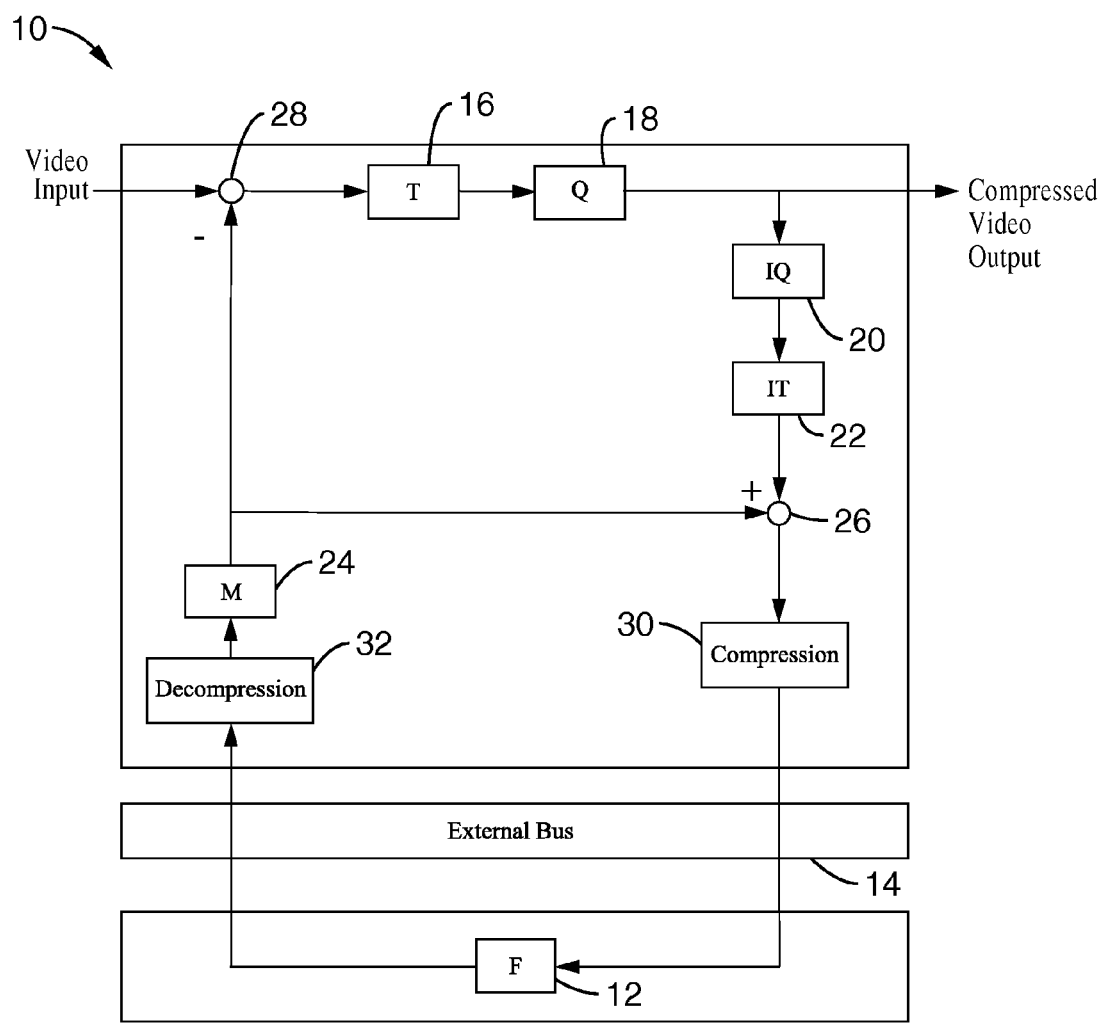
FIG. 3 is a simple block diagram of an encoder/decoder of a video codec system according to the invention.

The invention compresses the content of frame memory as illustrated in FIG. 3. The encoder 10 of FIG. 3 is similar to that of FIG. 1 with the addition of two new elements. Some of the elements shown in FIG. 1 are not repeated in FIG. 3 since they are not particularly relevant but would also be included. Encoder 10 is connected to an external frame memory (F) 12 through external bus 14. Encoder 10 includes transform unit (T) 16, quantizer unit (Q) 18, inverse quantizer unit (IQ) 20, inverse transform unit (IT) 22, and motion compensation unit (M) 24. Encoder 10 receives a Video Input through subtractor 28 which is also connected to the output of M 24. The outputs of IT 22 and M 24 are combined at adder 26. This architecture is not limited to a specific design but applies to all codecs following MPEG2, H.264 or other standards.

The two new elements added to encoder 10 are the compression unit 30 at the output to frame memory 12 and decompression unit 32 at the input from frame memory 12. The compression unit 30 compresses the decoded data from adder 26 before it is transferred to frame memory 12 over bus 14. When the content in the frame memory 12 is accessed over bus 14, the data obtained from frame memory 12 is decompressed by decompression unit 32 to the original data and input into motion compensation unit 24.

The contents of frame memory can be compressed in two different ways, lossy and lossless. In lossy compression, the precision of the original data can be lost in order to improve the compression efficiency. However, since the precision is lost, the decompressed data is not exactly the same as the original. In this case, the decoder can have mismatched data from the encoder. It is because the data used in motion compensation (M) in the encoder becomes different from that in M in the decoder. Therefore, they can generate different outputs. This error can be accumulated over time and produce severe drift error. This drift error can severely deteriorate the quality of decoded pictures if there are many consecutive P frames. Depending on the performance requirement of the application, even small drift error may not be acceptable.

The present invention typically uses a compression method that is nearly lossless. Also, if small drift is allowed, the invention can be extended to lossy compression (but with very minor drift error).

Compression Algorithm Overview

According to the invention, the frame memory is segmented into smaller blocks. This is necessary because in motion compensation and motion estimation, the pixel data in frame memory should be randomly accessible. The size of the block is decided by performance requirements. The invention does not limit the block size. It can apply to any size of block. However, for illustrative purposes, assume the size of luminance and chrominance blocks are 8×4 and 4×4 respectably.

The notation of the pixels in the luminance and chrominance blocks is illustrated in FIGS. 4A-B.

Figure 5:
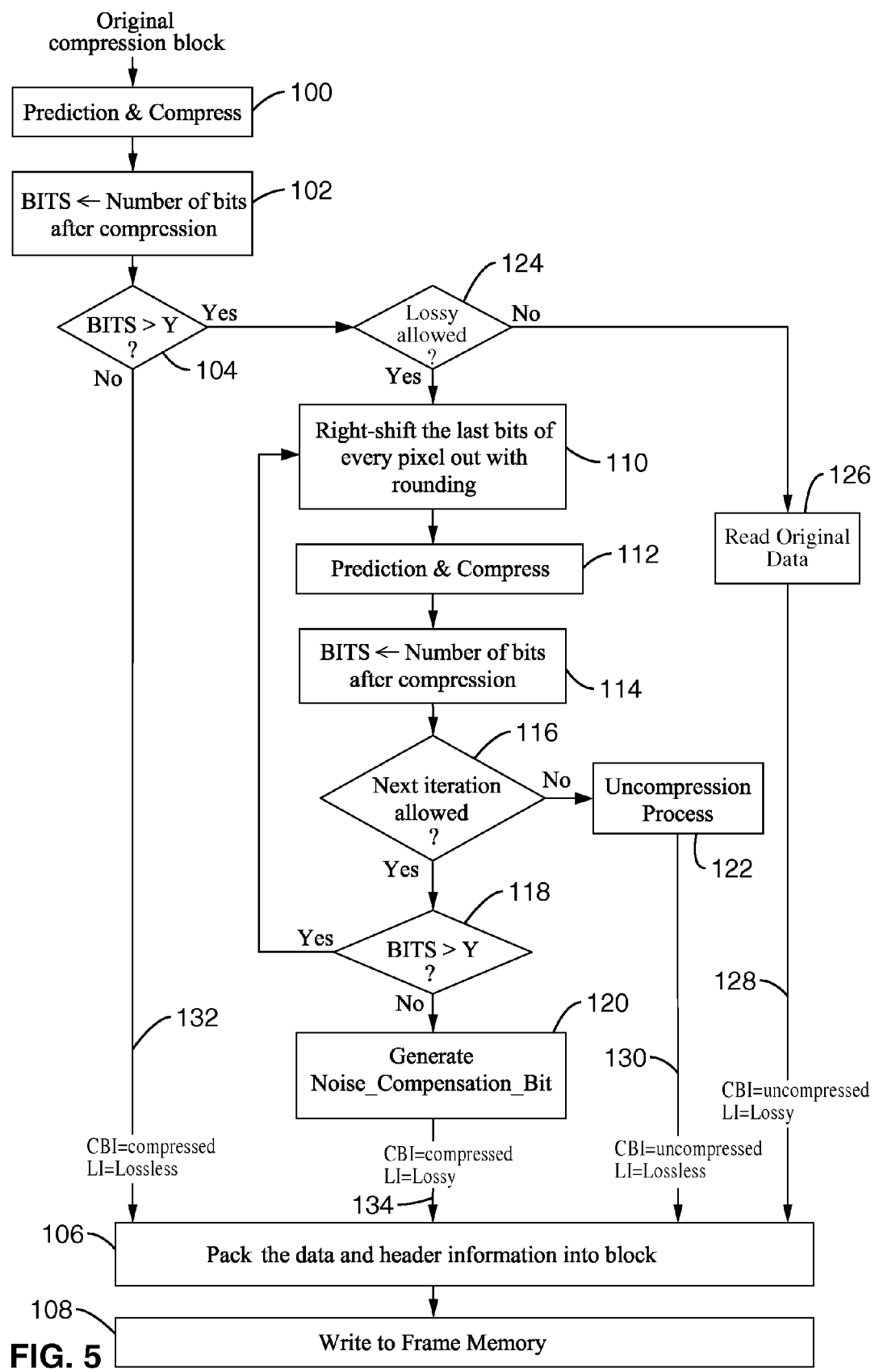
FIG. 5 is a flow chart of the compression process according to the invention.

The operation of the compression algorithm of the invention is illustrated in FIG. 5. The luminance and chrominance are compressed in a similar way. Here, only the details of luminance compression is presented.

First, the original 8×4 block is predicted and compressed, step 100. Again, in this regard it is important to note that an 8×4 block size is described only as an example, and that the invention is not limited to a particular block size. After compression, the number of bits used during the compression is evaluated, step 102. If the number of bits is within an allowed range Y (for example, Y can be set to ½, ⅓, ¼, etc. of the original size), step 104, the compressed data is packed, step 106, and stored to the frame memory, step 108, via an external bus. However, if the number of bits is over the allowed range, then a determination is made as to whether lossy compression is allowed, step 124. If lossy compression is allowed, then lossy compression is tried, step 110. If lossy compression is not allowed, the original data is used, step 126, without any further processing before being packed and stored to the frame memory. As can be seen, therefore, the present invention covers the cases where only lossy compression is allowed or only lossless compression is allowed, which would be determined by the particular application.

In the lossy compression processing steps, the precision of the original data is first reduced by removing one bit (the least significant bit (LSB)). This can be achieved by right-shifting by one with rounding, step 110. The reduction of precision is performed in every pixel at once in a whole block. Depending on the performance requirements, the amount of right-shift can be adjusted. Start with a 1 bit shift. If a 1 bit shift still produces too many compressed bits, continue to right-shift as long as the number of iterations is allowed.

After step 110, the new block is predicted and compressed, step 112. After compression, the number of bits used during the compression is evaluated, step 114. A determination is then made if the next iteration is allowed, step 116. Note that the number of allowed iterations is application specific; the number of allowed iterations would be greater to the extent that more noise is allowed. If further iterations are not allowed, the uncompression process, step 122, is performed and the data and header information is packed and stored to the frame memory. The uncompression process is a process to embed extra header information without losing any given information. On the other hand, if further iterations are allowed, a check is made to determine whether the number of bits is within the allowed range Y, step 118. If the number of bits is greater than Y, then the process returns to step 110. If the number of bits is not greater than Y, then the process proceeds to step 120 where a noise compression bit is generated.

As can be seen, therefore, there are essentially four different outcomes of the process: (i) compressed lossless data, (ii) uncompressed lossless data, (iii) compressed, lossy data, and (iv) uncompressed, lossy data Therefore, it is necessary to embed a maximum of two bits of header information (flags) to indicate the state of the block as follows:

CBI: Compressed/Uncompressed Block Indication (1 bit)
LI: Lossy/Lossless Indication (1 bit)

Note that, while two bits of header information is preferred because it will provide the exact state of the block, less header information could be alternatively embedded if desired. For example, in the case where the original block is preserved and written to frame memory, it might only be necessary to embed one bit of header information to indicate that the current block is not compressed. However, since the header information is embedded in original data block, there may be a loss due to the header and the block can be lossy, 128. The uncompression process, 122, can embed the header information without any data loss. Therefore, this same convention could be alternatively be used to indicate that the current block is not compressed and is either lossy 128, or lossless 130. Similarly, one bit of header information could be used to indicate that the block is compressed and lossless 132. This same convention could be alternatively used to indicate that the current block is compressed and is either lossless, 132, or lossy 134.

Figure 6:
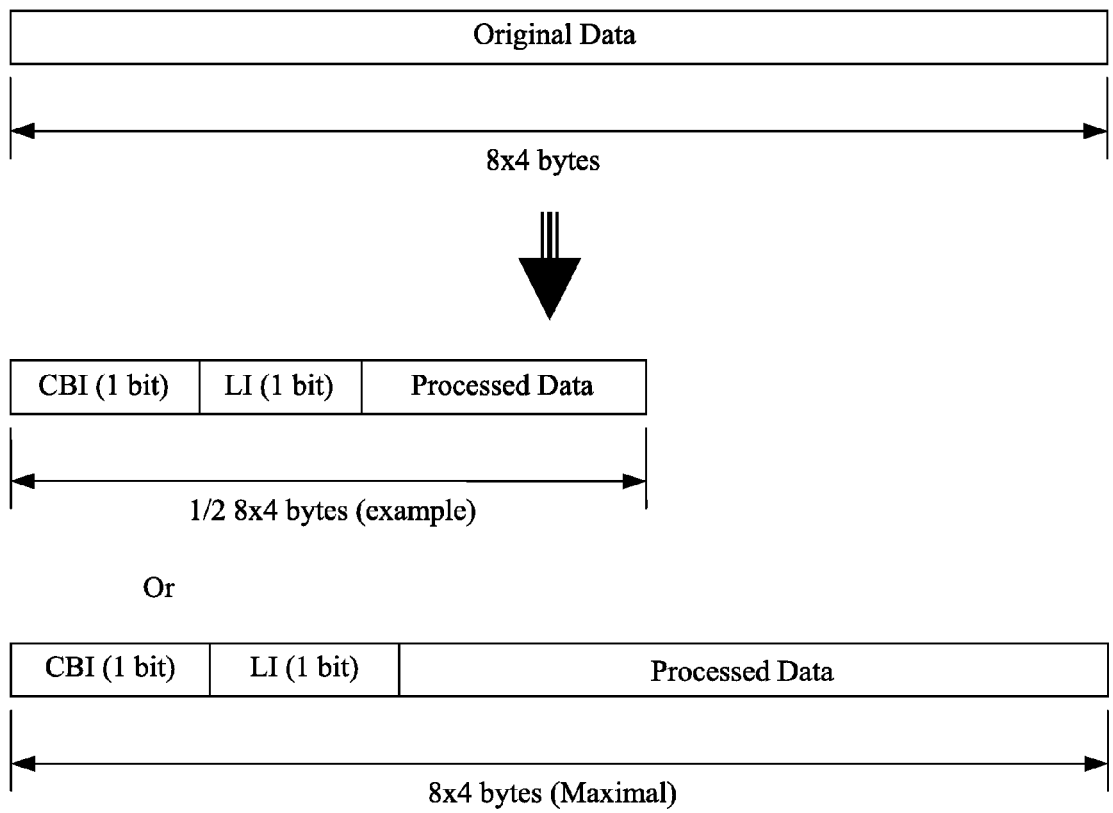
FIG. 6 shows the data structure created by embedding CBI and LI.

The process of embedding the CBI and LI bits is illustrated in FIG. 6. The processed data includes the two flags as the first two bits. The processed data may be at maximum the full original size or may be reduced in size, e.g. ½ as shown.

When the lossy compression is applied, the amount of noise induced during compression is computed and a Noise_Compensation_Bit (1 bit) is generated, step 50 of FIG. 5. This information is transferred to the decompression process so that it can compensate the noise.

After all the process is completed, the header information and data is packed into a packet, step 106 of FIG. 5. Depending on the bus requirement, the packet can be ½, ⅓, ¼, etc. of the original size or simply the original size, all depending on the particular application. The determination of the packet is implementation-dependent. The packed data is written to the frame memory, step 108.

Figure 7:
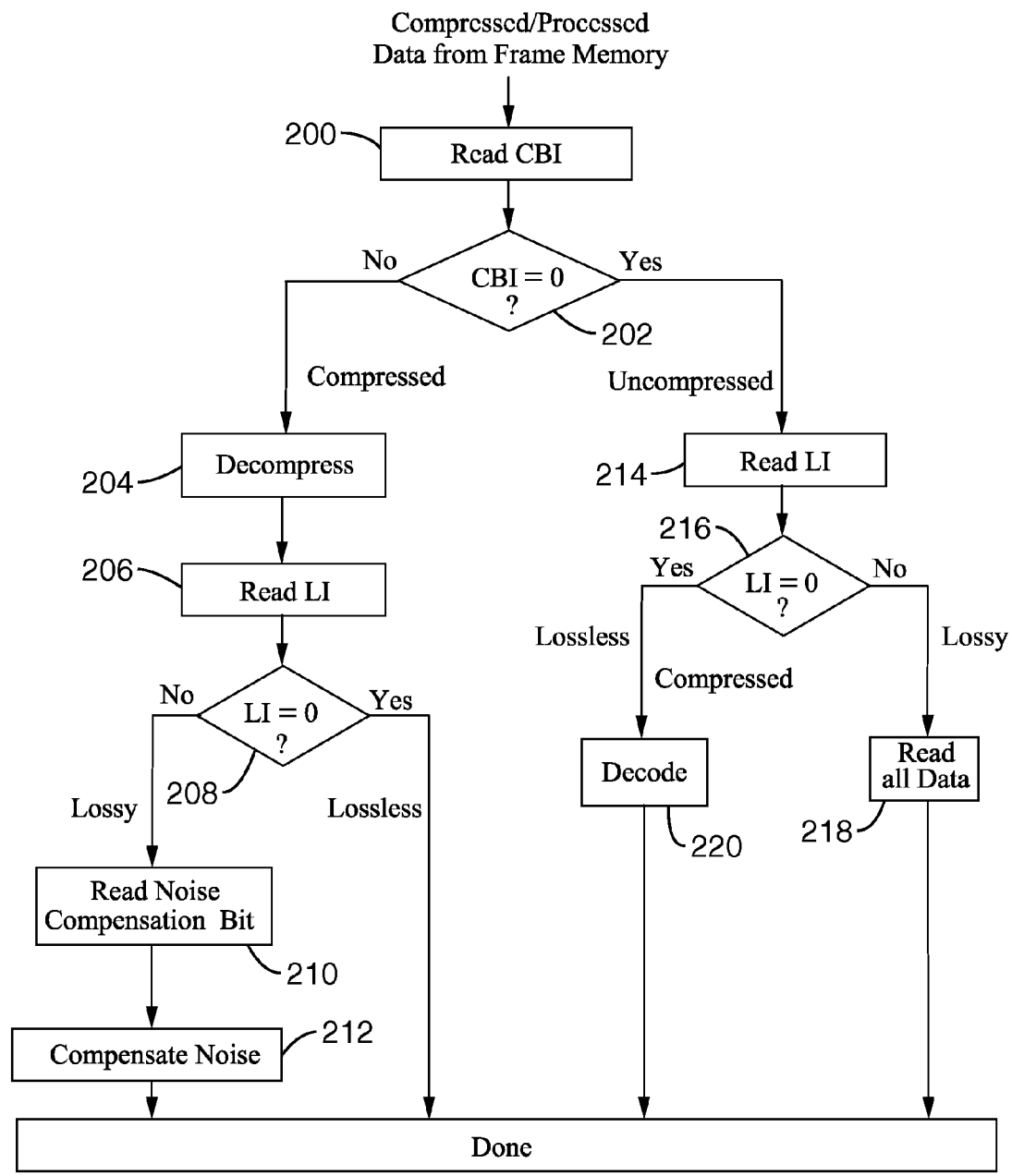
FIG. 7 is a flow chart of the decompression process according to the invention.

The compressed data in frame memory is supposed to be read during motion estimation or motion compensation processes during encoding. Therefore, once the block is read, it should be decompressed into its original dimensions. The decompression process is illustrated in FIG. 7.

First, the decompression process reads and checks the CBI bit, steps 200, 202. If the CBI bit is set (not 0), it indicates the block is compressed. In this case, the block is decoded using the same prediction used in the compression process and pixel values are generated, step 204. Also, the block can be lossy so LI is read and checked, steps 206, 208. If the block is compressed with loss (LI not 0), the Noise_Compensation_Bit is checked, step 210. Using this information the decompressed block is compensated to reduce the noise, step 212. This noise compensation block will be skipped if the block is losslessly compressed (LI=0).

If the block is not compressed (CBI=0), it is necessary to read and check LI (lossy or lossless), steps 214, 216. If it is lossy, the data contained in the block is simply original pixel data except one pixel that includes the header (CBI and LI). Of course, depending on the implementation, these two bits can be spread over two pixels (instead of one pixel with 2 bits noise). So all the data is read, step 218. When it is lossless, it is necessary to decode the block, step 220. The encoding process (uncompression process) and decoding process are presented in the next section.

Uncompression Process

Figure 8A:
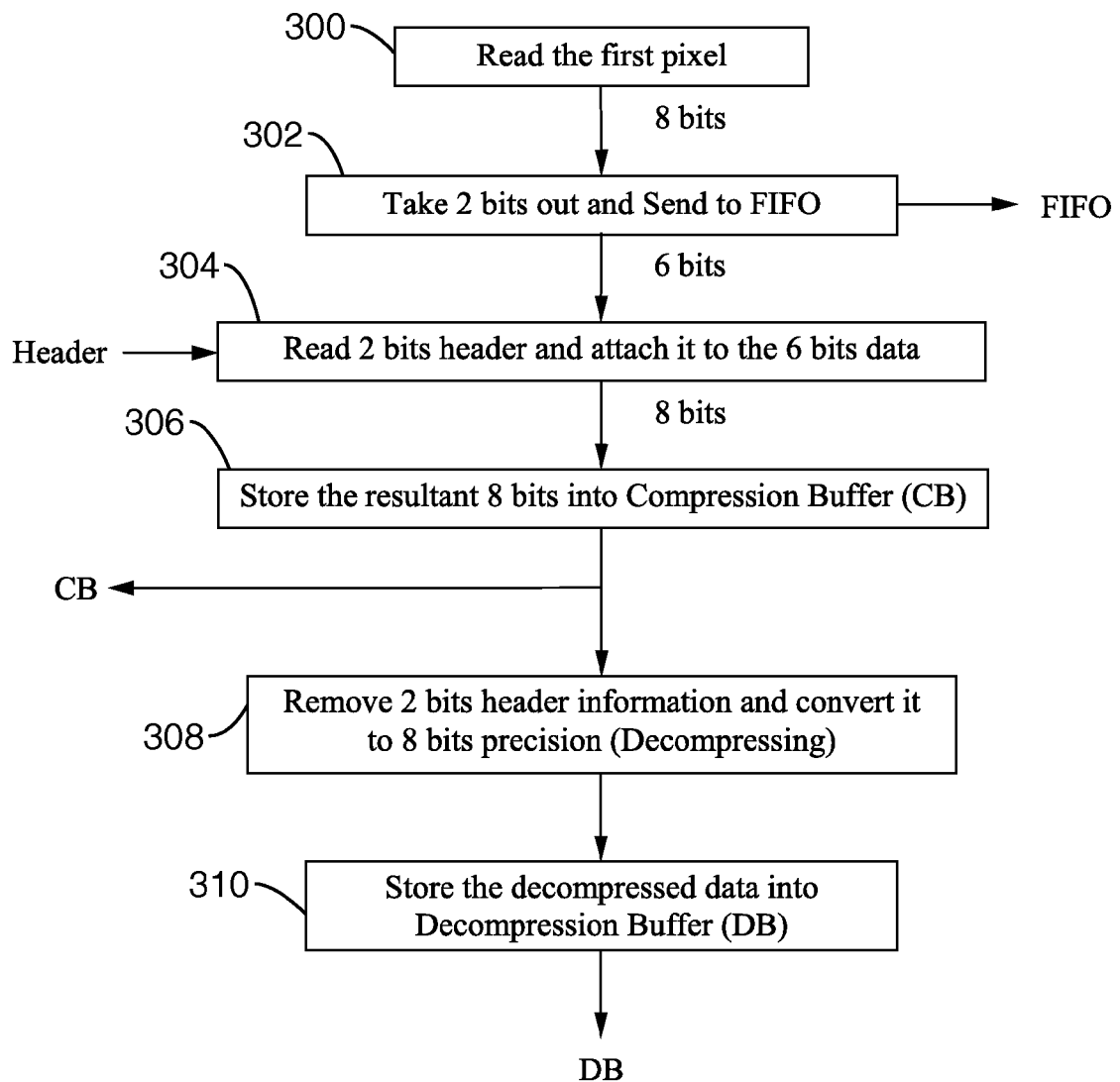
FIG. 8A and FIG. 8B are flow charts of the uncompression process according to the invention.
Figure 8B:
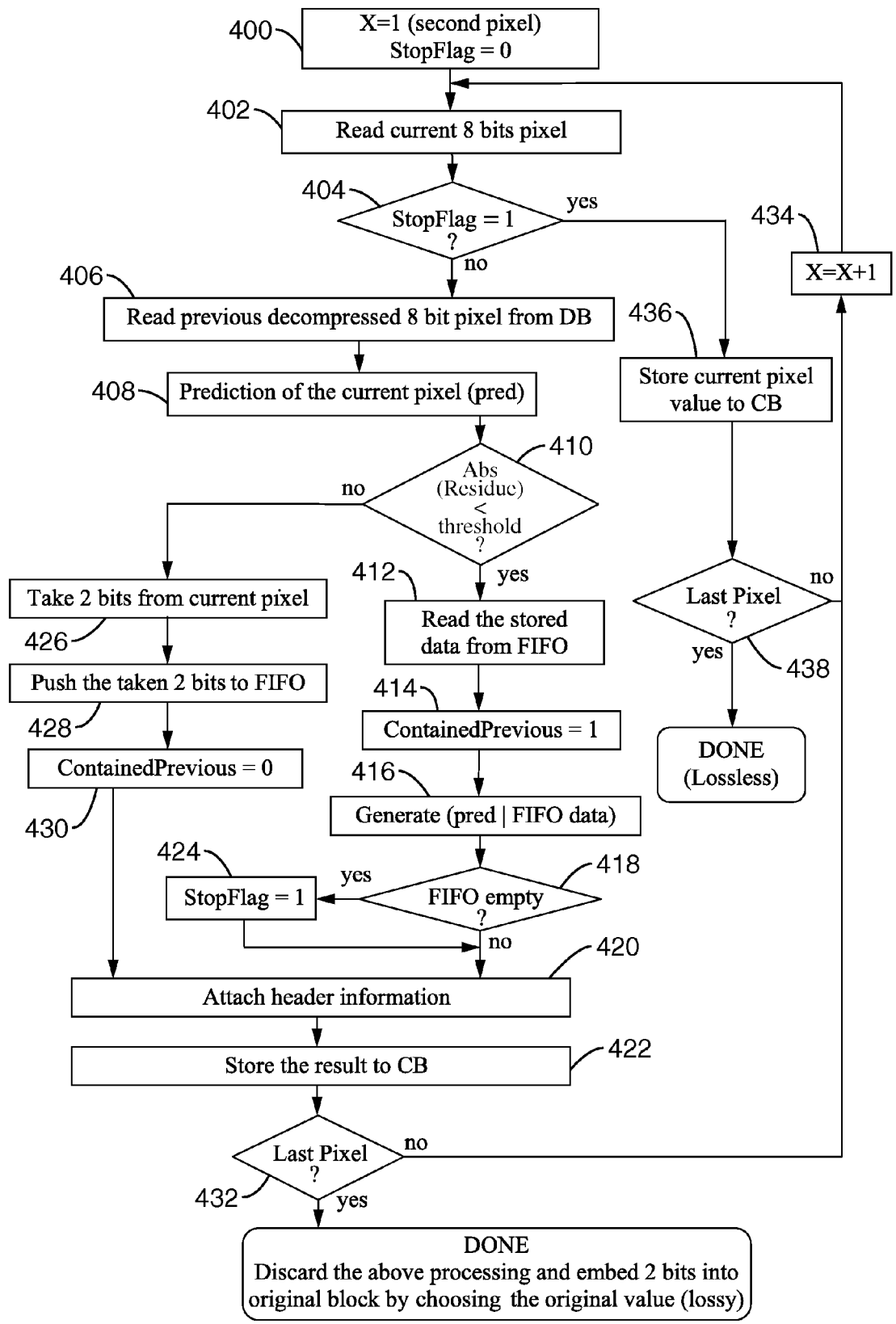

FIGS. 8A-B depicts an embodiment of the uncompression process. The uncompression process represents a process to embed extra information in the pixel information without changing the original pixel values. FIG. 8A shows the processing of the first pixel. In order to embed two bits of header (CBI and LI) in the uncompressed block, first read the first pixel, step 300, and process the first pixel by removing two bits from it, step 302. The removed 2 bits are stored in FIFO (First In First Out). The contents in FIFO will be embedded later when other pixels are processed.

There are two buffers, a Compression Buffer (CB) and a Decompression Buffer (DB). The CB contains the result of uncompression. This data will be transferred to frame memory once the uncompression is complete. Therefore, the maximum size of this buffer should be matched to the size of the original data (8×4 block). The DB is a temporary buffer that contains the decoded result. It is used in the prediction. Therefore, the size of DB can be one line (8×1) for the upper pixels plus one for the left pixel. For example, as illustrated in FIG. 4A, if current pixel position is P23, the upper pixel is P13 and the left pixel is P22. In this case, DB contains the upper line of (P10 to P17) and P22.

After the 2 bits are removed, the 2 header bits are added to the 6 bits of data, step 304. The 6 data bits (left after 2 bits are removed to FIFO) and 2 header bits (CBI, LI) constitute one packet. The packet is stored in CB, step 306. Since the decompressed previous pixel will be used in the prediction process, the first pixel will be decoded by removing the header bits and converting it to 8 bits precision, i.e. by filling two zeros at the position where the two bits are located, step 308. The result will be stored in DB, step 310.

Once the uncompression process of the first pixel is finished, the uncompression process of the remaining pixels is started. The detailed process is illustrated in FIG. 8B.

Starting from the second pixel (X=1), the current pixel value is predicted from the previous decompressed pixel. And then, the residual between the current and predicted value is computed. If the residual value is smaller than a threshold, the residual value can be represented by using a smaller number of bits. Since the original pixel is 8 bits, some bits remain available after using the smaller number of bits to represent the original pixel by residue. These extra available bits can be assigned as follows:

StopFlag (1 Bit)

To indicate whether the embedding has been done. If Stop-Flag=1, there will be no more prediction process. All the remaining pixels will be just the original value and stored in CB until the last pixel. If StopFlag=0, then some additional data (that needs to be embedded) still remains in FIFO. Therefore, the process is continued until there is additional space for the data.

ContainedPrevious (1 Bit)

ContainedPrevious indicates whether the current data contains a residual value or an original value. If the absolute value of the prediction is larger than a threshold, it means more than a specific number of bits are needed to represent the residue. In this case, just the original pixel value without prediction is used. However, since two bits (for StopFlag and Contained-Previous) are still needed to be embedded, two bits from original pixel data should be removed. The removed data will be put into FIFO.

If the residue is smaller than a threshold, excluding 2 bits for flags, there are some extra bits available. These available bits are used to embed the data in FIFO. Some bits are read from FIFO and a packet is constructed that contains residual data, 2 bits header and some FIFO data. The resultant packet will be stored to CB.

Once the FIFO is empty, all the header information is embedded in the block, and there is no need to process further. At this time, set StopFlag=1.

It should be noted that in the worst case, the FIFO may not be empty even when the processing of all the pixels is finished. If this happens, the header information cannot be embedded. Therefore, the lossy process will be applied. In the lossy process, pick one pixel and take 2 bits away. In the position of the removed bits, integrate the header information. Instead of 2 bits in one pixel, one can select two pixels and remove one bit each. In this way, the error in the pixel will be smaller than 2 bits error.

To follow the details of the process, as shown in FIG. 8B, start with the second pixel (counter X=1) with the Stop-Flag=0, step 400, and read the current 8 bits of the pixel, step 402. Check if the StopFlag=1, step 404. For the second pixel (X=1), StopFlag=0, so the answer is no. If no, read the previous decompressed 8 bit pixel from DB, step 406, and determine the residual value of the current pixel after prediction, step 408. Next, a check is made to determine if the absolute value of the residual value is less than a threshold, step 410. If yes, (for example, the residual value ranges between −7 and 7 so it can be represented by 4 bits), then read the stored data from FIFO, step 412; set ContainedPrevious=1, step 414; and generate a partial packet with 4 bits of predicted value data and 2 bits of FIFO data, step 416. Check if FIFO is empty, step 418. If it is not empty add the 2 flag bits (StopFlag=0) to complete the 8 bit packet, step 420, and store the packet in CB, step 422. If FIFO is empty, step 418, set StopFlag=1, step 424, and then attach the header information, step 420, and store the result in CB, step 422.

If the residual value is greater than a threshold, then the current pixel value is used without prediction. In this case, 2 bits are removed from the original pixel, step 426, put the 2 bits in FIFO, step 428, set ContainedPrevious=0, step 430, attach the header information, step 420, and store the result in CB, step 422. After storing the result in CB, step 422, by whichever path, then check if it is the last pixel, step 432. If not, then increment the counter X=X+1, step 434, and return to step 402, and read the current 8 bit pixel.

If at step 404, StopFlag=1, then no more prediction is performed, and the current pixel value is stored in CB, step 436. Then check if it is the last pixel, step 438. If not, increment the counter X=X+1, step 434, and return to step 402. The process continues until the last pixel is reached, step 432 or 438.

Prediction and Compression

The pixel in the block is predicted from previously decompressed pixels. The first pixel is not predicted. Instead, it preserves its original value. As shown in FIG. 9A, the neighboring decompressed pixels of A, B and C around the current pixel X are used in the prediction.

Prediction of X
=Px
=function (A, B, C)

The current compression algorithm is designed so that the block is completely compressed on its own without referring to outside of the block. Therefore, any information outside of the block is not used. Such an independent compression method is desirable because in video codec motion compensation, it is necessary to access the block randomly. If the block has a dependency on any previous block, it may not be feasible to apply this algorithm. Therefore, the outside boundary of the block is assumed to be all zeros as shown in FIG. 9B.

After prediction, the residue between the prediction and the current pixel is computed as:

$$Rx = \text{Residual of current pixel} = (\text{current pixel value}) - Px.$$

Figure 10C:
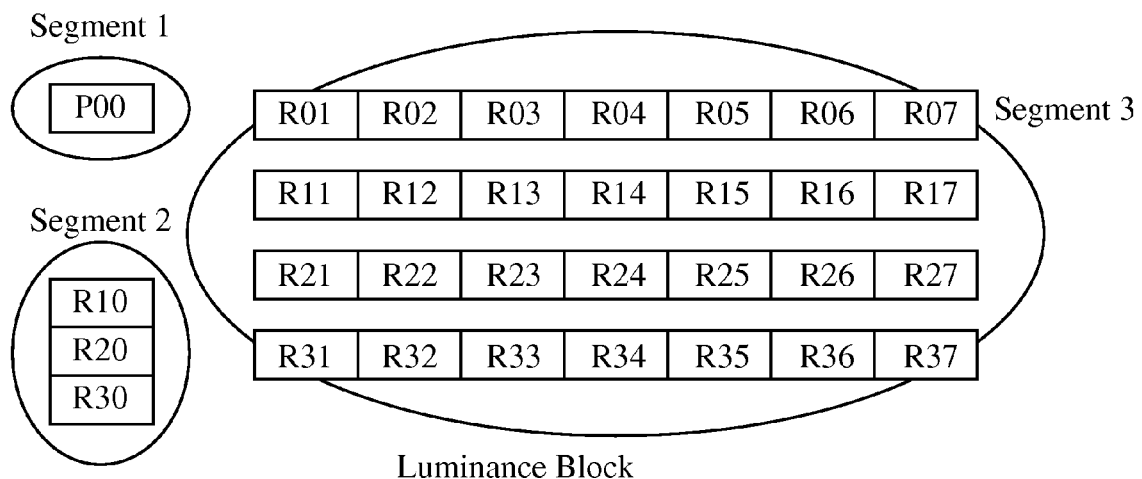
FIG. 10C and FIG. 10D illustrate the segmenting of the 8×4 luminance and 4×4 chrominance blocks of FIG. 10A and FIG. 10B, respectively.
Figure 10D:
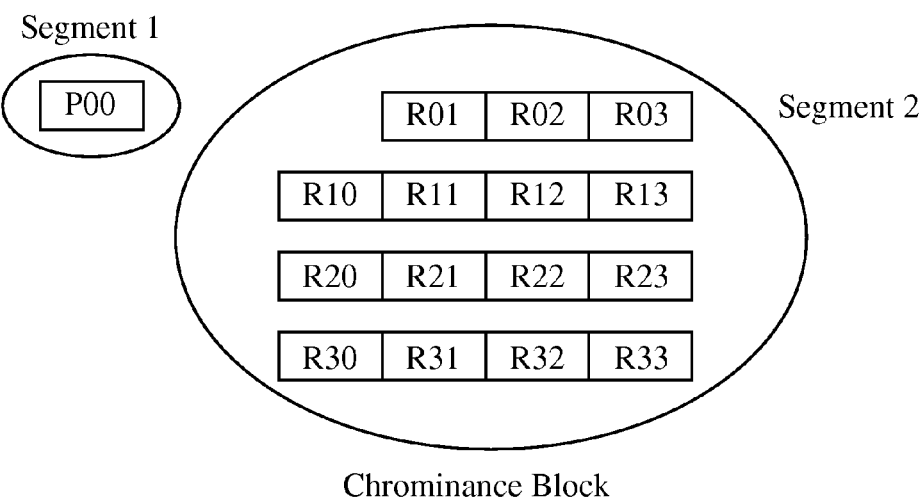

After prediction, the 8×4 and 4×4 blocks will be as in FIGS. 10A-B. The 8×4 luminance block will be segmented into 3 and the 4×4 chrominance block into 2, as shown in FIGS. 10C-D. The following will only present how to compress the luminance block for illustrative purposes. However, the chrominance block can be compressed in the same way.

Luminance Segment 1

Segment 1 only contains the first pixel. Therefore, 8 bits will be needed to preserve the original value. The number of required bits is R(1)=8.

Luminance Segment 2

Segment 2 contains the residual data obtained from prediction. First find a maximum value as:

$$\text{Max} = \text{Maximum}(abs(R10), abs(R20), abs(R30)).$$

In order to decompress the above data, 3 bits of header information are necessary:
DataProcessed (1 bit)
to indicate whether the data is processed or not and
BitCode (2 bits)
to indicate the assigned number of bits.

Based on those two flags, all the data in luminance segment 2 is assigned. Since there are 3 pixels in luminance segment 2, the required bits will be:

$$R(2) = 3 * Bf$$

Where Bf is a final number of bits assigned.

Luminance Segment 3

In luminance segment 3, all the 7×1 row pixels will be compressed in the same way. Similarly to segment 2, first find a maximum among all the data in 7×1 residual data as:

$$\text{Max} = \text{Maximum}(abs(R01), abs(R02), \ldots, abs(R00)).$$

In a similar way for decompression, 4 bits of header information are defined as:
DataProcessed (1 bit)
to indicate whether the data is processed or not and
BitCode (3 bits)
to indicate the assigned number of bits.

Based on these two flags, all the data in luminance segment 3 is assigned Since there are 4 of the 7×1 subblocks in luminance segment 3, the required bits will be:

$$R(3) = 4 * Bf.$$

In summary, the total number bits used in the compression will be:

$$R = R(1) + R(2) + R(3) + 2(CBI \text{ and } LI).$$

Noise Compensation

When a lossy compression is used, the least significant bits are truncated with rounding. Therefore, in this process, truncation noise is involved. Theoretically, one cannot recover this loss in the decompression process. However, the invention uses a noise compensation method to reduce the noise by sending an extra 1 bit of information to the decoder.

The main idea is that during the truncation process, the number of '1's or '0's that are truncated are counted. If the most truncated value is '1', set the Noise_Compensation_Bit to be 1 so that in the decoder side, once all the data is decompressed, set the LSB to be 1. Therefore, it will reduce the noise by just leaving all the values to be '0' or '1' statistically. The same method is applied when the majority value of the truncated bit is '0'.

This noise compensation method can be applied to smaller block than the compression block. For example, four 8×1 blocks in an 8×4 compression block can be used. In this case, there will be 4 bits of Noise_Compensation_Bit. Those bits are embedded in similar way as in uncompression process.

The noise in chrominance is also compensated in the same way.

ADDITIONAL FEATURES AND CONCLUSION

A feature of the invention is a method to compress the video data to smaller size without causing any significant visual artifact (near lossless with maximum 1 bit error in whole block). The method can be applied to a frame memory compression due to insignificant visual artifact because the drift noise can be negligible. In the method, a maximum precision that needs to represent the residual data is found, and this precision is applied for the compression.

Another feature of the invention is a method to segment the block into smaller blocks to use a smaller number of bits to compress. In the method, instead of finding a maximum precision in a whole block, the block is segmented into smaller blocks and a maximum precision is found in each subblock. Therefore, a different precision is assigned to each subblock to prevent the use of an unnecessarily higher number of bits to represent the block in compressed format.

A further feature of the invention is a method to extend the lossless compression method to lossy compression by allowing compression noise. If further compression gain is required, the method can be extended to weight more on the lossy compression. In this case, instead of generating lossy compression in a whole block, subblocks are selectively picked to constrain the loss in smaller blocks.

Yet another feature of the invention is that each subblock in a compression block can have a different level of noise range. Therefore, it provides more compression gain while maintaining small noise level.

A further feature of the invention is a method to compensate the compression noise when the lossy compression is applied. The noise is estimated in the compression process and approximated to 1 bit. This approximated noise is embedded in the compressed block. In the decompression process, the noise is compensated using this information.

Another feature of the invention is a method to embed extra information without any loss of original data. If the block is not compressed, extra header information should be carried. The method puts extra information without losing any original pixel data.

The invention thus provides a video codec system that greatly reduces data transfer between the encoder and external frame memory over an external bus. This would have particular application for storing a video data into storage. Also, it can be applied to applications that needs to embed any extra information into the video data without losing the original contents.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device to address each and every problem sought to be solved by the present invention, for it to be encompassed by the present claims. Furthermore, no element or component in the present disclosure is intended to be dedicated to the public regardless of whether the element or component is explicitly recited in the claims. No claim element herein is to be construed under the provisions of 35 U.S.C. 112, sixth paragraph, unless the element is expressly recited using the phrase "means for."

What is claimed is:

1. A method for reducing video data transfer between an encoder and an external frame memory connected via an external bus in a video codec, comprising:
    dividing each frame of video data into blocks, and segmenting each block into blocks of smaller size;
    compressing video data from an encoder prior to inputting into a frame memory over an external bus;
    wherein each block is compressed by first predicting and compressing each original block, and then determining if a number of bits used during compression is within an allowed range;
    decompressing compressed video data from the frame memory after retrieving over the external bus;
    compressing the video data by lossy compression if the number of bits used during compression is not within an allowed range; and
    generating a noise compensation bit to indicate an amount of noise introduced during compression.

2. The method of claim 1, wherein the video data is compressed by lossless compression.

3. The method of claim 1, wherein the video data is compressed by lossy compression.

4. The method of claim 3:
    wherein in said lossy compression, compression noise is compensated by estimating noise in compression and embedding noise information in a compressed block; and
    wherein noise is compensated during decompression.

5. The method of claim 3, wherein during compression the least significant bit is truncated and the majority truncated bit is set as a noise compensation bit, and during decompression the least significant bits are set to the majority truncated bit.

6. The method of claim 1, wherein the video data is compressed by combination of lossless compression and lossy compression.

7. The method of claim 6, further comprising embedding extra information in each compressed block without losing original information in the block, at least one said extra information comprising a compressed/uncompressed block indication, and at least one said extra information comprising a lossy/lossless indication.

8. The method of claim 6, further comprising determining a maximum precision that is needed to represent the residual data in each block, and this maximum precision is applied for the compression of the block.

9. The method of claim 6, further comprising:
    wherein said blocks of smaller size comprise subblocks;
    determining a maximum precision for each subblock; and
    compressing each subblock using the maximum precision for that subblock.

10. The method of claim 1, wherein the frames are luminance frames and chrominance frames.

11. The method of claim 1, further comprising:
    wherein said blocks of smaller size comprise subblocks;
    applying a different level of compression to said subblocks;
    wherein inside one compression block, both lossy and lossless subblocks are integrated together.

12. The method of claim 1, further comprising packing the compressed video data into a packet and storing the packet in the frame memory if the number of bits used during compression is within said allowed range.

13. The method of claim 12, wherein the compressed video data from frame memory is decompressed by first determining if each block is compressed, and if compressed, decoding each block using the same precision used in compressing the block.

14. The method of claim 13, wherein determining if each block is compressed is performed by reading an embedded compressed/uncompressed bit.

15. The method of claim 13, further comprising determining if the block is compressed by lossy compression, and if so, compensating the decompressed block to reduce noise.

16. The method of claim 15, wherein determining if the block is compressed by lossy compression is performed by reading an embedded lossy/lossless bit.

17. The method of claim 15, wherein compensating the decompressed block comprises reading a noise compensation bit.

18. The method of claim 13, further comprising, if a block is not compressed, determining if the video data was compressed by lossy compression, and if so decoding the data and if not reading all the data.

19. The method of claim 1, wherein lossy compression is performed by reducing precision of the original video data.

20. The method of claim 1, wherein the video data is processed by an uncompression process if lossy compression is not allowed.

21. The method of claim 20, wherein the uncompression process is performed by first processing the first pixel by reading the first pixel, taking some bits out of the first pixel and sending the removed bits to FIFO, reading additional bits of header and attaching the header bits to the remaining bits of the first pixel, storing the result in a compression buffer, decompressing the processed first pixel, and storing the decompressed first pixel in a decompression buffer.

22. The method of claim 21, wherein the uncompression process is further performed starting with the second pixel by predicting the current pixel value from the previous decompressed pixel, computing the residual between the current and predicted values, determining the number of bits required for the residual, and embedding a stop flag bit and a contained previous bit and any FIFO data in available bits.

23. A method for reducing video data transfer between an encoder and an external frame memory connected via an external bus in a video codec, comprising:
  dividing each frame of video data into blocks, and segmenting each block into blocks of smaller size;
  compressing data from an encoder prior to inputting into a frame memory over an external bus;
  wherein each block is compressed by first predicting and compressing each original block, and then determining if a number of bits used during compression is within an allowed range;
  decompressing compressed data from the frame memory after retrieving over the external bus;
  compressing the video data by lossy compression if the number of bits used during compression is not within an allowed range; and
  wherein the video data is processed by an uncompression process if lossy compression is not allowed.

24. The method as recited in claim 23, wherein the video data is compressed by lossless compression, lossy compression or a combination of lossless compression and lossy compression.

25. The method as recited in claim 24, further comprising embedding extra information in each compressed block without losing original information in the block, at least one said extra information comprising a compressed/uncompressed block indication, and at least one said extra information comprising a lossy/lossless indication.

26. The method as recited in claim 24, further comprising determining a maximum precision that is needed to represent residual data in each block, and applying this for the compression of the block.

27. The method as recited in claim 24, further comprising:
  segmenting each block into subblocks;
  determining a maximum precision for each subblock; and
  compressing each subblock using the maximum precision for that subblock.

28. The method as recited in claim 24, wherein the uncompression process is performed by first processing the first pixel by reading the first pixel, taking some bits out of the first pixel and sending the removed bits to FIFO, reading additional bits of header and attaching the header bits to the remaining bits of the first pixel, storing the result in a compression buffer, decompressing the processed first pixel, and storing the decompressed first pixel in a decompression buffer.

29. The method as recited in claim 28, wherein the uncompression process is further performed starting with the second pixel by predicting the current pixel value from the previous decompressed pixel, computing the residual between the current and predicted values, determining the number of bits required for the residual, and embedding a stop flag bit and a contained previous bit and any FIFO data in available bits.

30. The method as recited in claim 24:
  wherein in said lossy compression, compression noise is compensated by estimating noise in compression and embedding noise information in a compressed block; and
  wherein noise is compensated during decompression.

31. The method as recited in claim 24, wherein during compression the least significant bit is truncated and the majority truncated bit is set as a noise compensation bit, and during decompression the least significant bits are set to the majority truncated bit.

32. The method as recited in claim 23, wherein said frames comprise luminance frames and chrominance frames.

33. The method as recited in claim 23:
  wherein said blocks of smaller size comprise subblocks;
  wherein said subblocks have a different level of compression; and
  wherein inside one compression block, lossy and lossless subblocks can be integrated together.

34. The method as recited in claim 23, further comprising packing the compressed video data into a packet and storing the packet in the frame memory if the number of bits used during compression is within an allowed range.

35. The method as recited in claim 34, wherein the compressed data from frame memory is decompressed by first determining if each block is compressed, and if compressed, decoding each block using the same precision used in compressing the block.

36. The method as recited in claim 35, wherein determining if each block is compressed is performed by reading an embedded compressed/uncompressed bit.

37. The method as recited in claim 35, further comprising determining if the block is compressed by lossy compression, and if so, compensating the decompressed block to reduce noise.

38. The method as recited in claim 37, wherein determining if the block is compressed by lossy compression is performed by reading an embedded lossy/lossless bit.

39. The method as recited in claim 37, wherein compensating the decompressed block comprises reading a noise compensation bit.

40. The method as recited in claim 35, further comprising, if a block is not compressed, determining if the video data was compressed by lossy compression, and if so decoding the video data and if not reading all the video data.

41. The method as recited in claim 23, wherein lossy compression is performed by reducing the precision of the original video data.

42. The method as recited in claim 23, further comprising generating a noise compensation bit to indicate the amount of noise introduced during compression.

43. A method for reducing video data transfer between an encoder and an external frame memory connected via an external bus in a video codec, comprising:
dividing each frame of video data into blocks, and segmenting each block into blocks of smaller size;
compressing data from an encoder prior to inputting into a frame memory over an external bus;
wherein each block is compressed by first predicting and compressing each original block, and then determining if a number of bits used during compression is within an allowed range;
decompressing compressed data from the frame memory after retrieving over the external bus;
compressing the video data by lossy compression if the number of bits used during compression is not within an allowed range;
wherein the video data is processed by an uncompression process if lossy compression is not allowed; and
wherein the uncompression process is performed by first processing a first pixel by reading the first pixel, taking some bits out of the first pixel and sending the removed bits to FIFO, reading additional bits of header and attaching the header bits to the remaining bits of the first pixel, storing the result in a compression buffer, decompressing the processed first pixel, and storing the decompressed first pixel in a decompression buffer.

44. The method of claim 43, wherein the uncompression process is further performed starting with a second pixel by predicting a current pixel value from the previous decompressed pixel, computing a residual between current and predicted values, determining a number of bits required for the residual, and embedding a stop flag bit and a contained previous bit and any FIFO data in available bits.

45. A method for reducing video data transfer between an encoder and an external frame memory connected via an external bus in a video codec, comprising:
dividing each frame of video data into blocks, and segmenting each block into subblocks;
determining a maximum precision for each subblock;
compressing each subblock using a maximum precision for that subblock; said subblocks are compressed from an encoder prior to inputting into a frame memory over an external bus;
wherein the video data is compressed by combination of lossless compression and lossy compression; and
decompressing compressed video data from the frame memory after retrieving over the external bus.

46. The method as recited in claim 45, wherein said video data comprises luminance frames and chrominance frames.

47. The method as recited in claim 45, further comprising generating a noise compensation bit to indicate an amount of noise introduced during compression.

48. A method for reducing video data transfer between an encoder and an external frame memory connected via an external bus in a video codec, comprising:
dividing each frame of video into blocks;
compressing video data from an encoder prior to inputting into a frame memory over an external bus;
wherein each block is compressed by first predicting and compressing each original block, and then determining if a number of bits used during compression is within an allowed range;
packing compressed video data into a packet and storing the packet in the frame memory if the number of bits used during compression is within an allowed range;
decompressing the compressed video data from the frame memory after retrieving over the external bus; and
determining if the block is compressed by lossy compression, and if so, compensating the decompressed block by reading a noise compensation bit to reduce noise;
wherein the compressed video data from frame memory is decompressed by first determining if each block is compressed, and if compressed, decoding each block using an identical precision used in compressing the block.

49. A method for reducing data transfer between an encoder and an external frame memory connected via an external bus in a video codec, comprising:
compressing video data, by lossy compression, from an encoder prior to inputting into a frame memory over an external bus; and
decompressing compressed video data from the frame memory after retrieving over the external bus;
wherein in said lossy compression, compression noise is compensated by estimating noise in compression and embedding noise information in a compressed block; and
wherein noise is compensated during decompression.

50. The method as recited in claim 49, wherein said video data comprises luminance frames and chrominance frames.

51. The method as recited in claim 49, further comprising:
wherein frames of said video data are divided into blocks;
segmenting said blocks into subblocks having a different level of compression.

52. The method as recited in claim 49, further comprising generating a noise compensation bit to indicate an amount of noise introduced during compression.

53. The method as recited in claim 49, wherein the video data is processed by an uncompression process if lossy compression is not allowed.

54. A method for reducing video data transfer between an encoder and an external frame memory connected through an external bus in a video codec, comprising:
compressing video data, by lossy compression, from an encoder prior to inputting into a frame memory over a external bus; and
decompressing compressed video data from the frame memory after retrieving over the external bus;
wherein during compression a least significant bit is truncated and a majority truncated bit is set as a noise compensation bit, and during decompression the least significant bits are set to the majority truncated bit.

55. The method as recited in claim 54, wherein said video data comprises luminance frames and chrominance frames.

56. The method as recited in claim 54, further comprising:
wherein frames of said video data are divided into blocks;
segmenting said blocks into subblocks having a different level of compression.

57. The method as recited in claim 54, further comprising generating a noise compensation bit to indicate an amount of noise introduced during compression.

58. The method as recited in claim 54, wherein the video data is processed by an uncompression process if lossy compression is not allowed.

* * * * *